United States Patent [19]

Zan

[11] Patent Number: 4,657,675

[45] Date of Patent: Apr. 14, 1987

[54] SOLAR WATER CONDITIONING APPARATUS FOR FISHPOND

[76] Inventor: Ja D. Zan, 7-6th Fl., No. 190, Sec. 2, Kee Lung Rd., Taipei, Taiwan

[21] Appl. No.: 812,189

[22] Filed: Dec. 23, 1985

[30] Foreign Application Priority Data

Jun. 10, 1985 [DE] Fed. Rep. of Germany ... 8516926[U]

[51] Int. Cl.4 .............................................. C02F 7/00
[52] U.S. Cl. .................................... 210/170; 210/220; 210/251; 210/266; 210/295; 261/121.1; 119/3
[58] Field of Search ............ 210/170, 204, 220, 242.2, 210/251, 295, 266, 298, 319; 261/121 R, 122, DIG. 70, DIG. 71; 119/3

[56] References Cited

U.S. PATENT DOCUMENTS

| | | | |
|---|---|---|---|
| 3,758,083 | 9/1973 | Palmer | 210/242.2 X |
| 4,216,091 | 8/1980 | Mineau | 210/242.2 X |
| 4,219,387 | 8/1980 | Gruntman | 210/220 X |
| 4,268,398 | 5/1981 | Shuck et al. | 210/170 X |
| 4,436,675 | 3/1984 | Hisao et al. | 210/220 X |
| 4,464,259 | 8/1984 | Cramer et al. | 210/170 X |

Primary Examiner—Tom Wyse
Attorney, Agent, or Firm—Thomas R. Vigil

[57] ABSTRACT

A solar water conditioning apparatus for a fishpond which includes a top container and a lower container interconnected by an elongated member. The top container is adapted for exposure to the atmosphere and the bottom container is adapted to be immersed in the fishpond. On the top of the top container is provided a device for converting solar energy into electric power which actuates a motor so as to operate an air pump to introduce fresh air into a hollow column which has its lower portion embedded in a filtering medium of the bottom container and has its upper portion extended outward from the bottom container. The apparatus not only replenishes the amount of oxygen dissolved but also filtrates some polluting material.

6 Claims, 1 Drawing Figure

SOLAR WATER CONDITIONING APPARATUS FOR FISHPOND

BACKGROUND OF THE INVENTION

This invention relates to a water conditioning apparatus for a fishpond and particularly to a solar water conditioning apparatus which supplys fresh air into the water and filtrates, to some extent, polluting material.

It is known to condition water or to replenish the dissolved oxygen in a fishpond by pumping fresh air into the water. In common practice, the air is pumped into the water by an electric motor which is connected to a power source. Such a device consumes power and involves an increase in the cost of a fish raising industry.

SUMMARY OF THE INVENTION

An object of the invention is to provide a water conditioning apparatus which utilizes solar energy and reduces the cost of fish raising.

This and other objects can be achieved in accordance with the present invention through the provision of a solar water conditioning apparatus which is comprised of a top container having an air inlet for exposure to atmosphere, a lower container for being immersed in the water which has a water inlet and contains a filtering material which fills a part of the lower container, an elongated member for supporting the top container which interconnects the top and the lower containers, means for converting solar energy into electric power provided at the top of the top container, a motor actuated by the converting means mounted in the top container and connected to the converting means, an air receiving hollow column provided in the lower container. The column has its lower portion embedded in the filtering material and its upper portion opened and extended outward from the lower container. The lower portion of the column is provided with an opening for admission of water. There is further provided an air pump mounted in said top container and connected to the motor, the air pump having an air conduit extended into the air receiving column.

According to the present invention, the means for converting solar energy into electric power may include a watertight casing having a transparent glass cover at its top side, a photo cell and light reflecting means, such as mirrors, disposed in the casing.

The air pump may be a reciprocating pump which has a diaphragm and a rubber cup to be reciprocated by the motor through an eccentric rotor.

The present exemplary preferred embodiment will be described in detail with reference to the accompanying drawing, wherein:

DETAILED DESCRIPTION OF THE PREFERRED EMBODIMENT

Figure 1:
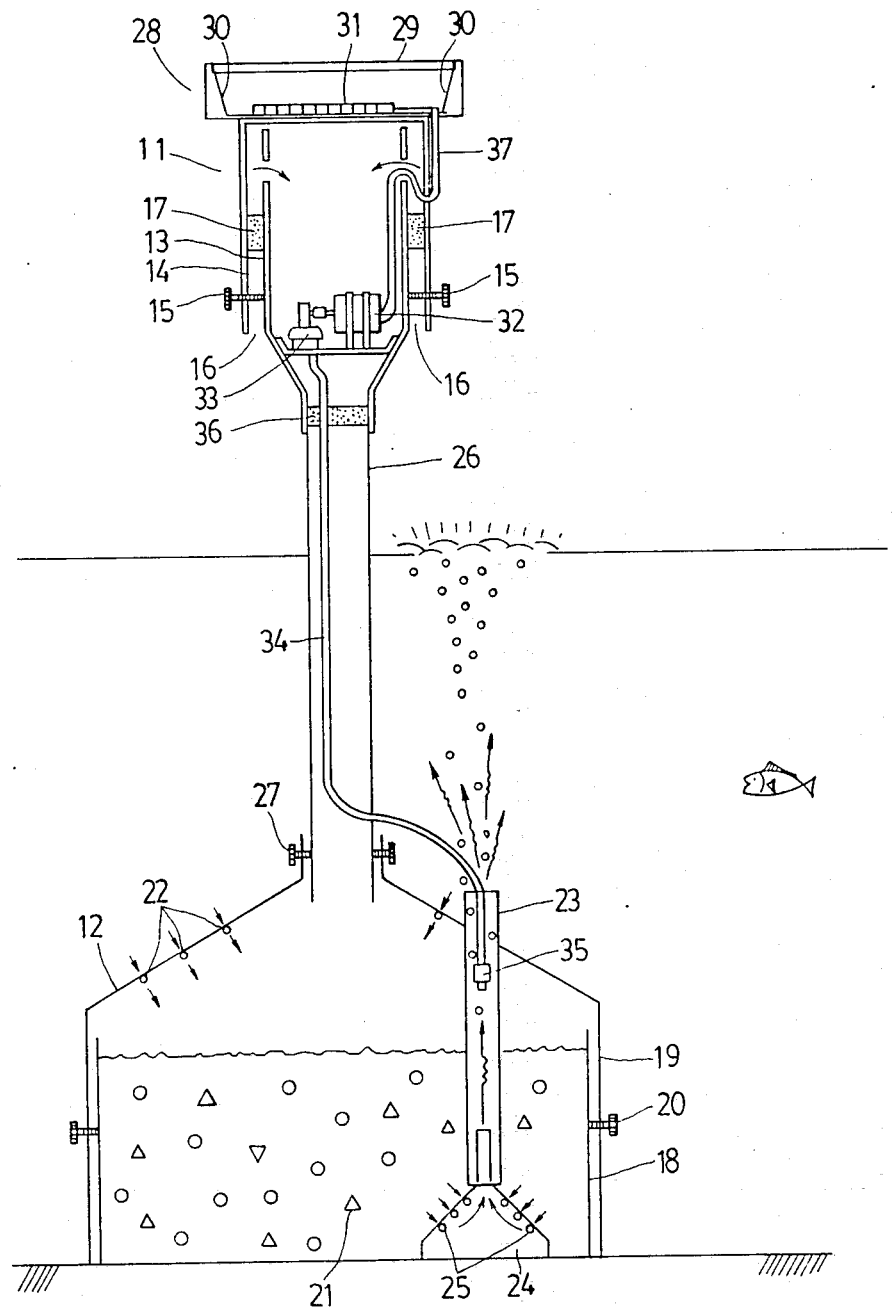
FIG. 1 is a schematic view of a solar water conditioning apparatus for a fishpond constructed according to the present invention.

Referring to the drawing, there is shown an apparatus 10 which includes a top container 11 exposed to the atmosphere and a bottom container 12 immersed in a fishpond. The top container 11 is constituted of a hopper-like lower housing 13, and an upper housing 14 which has a closed top, an open bottom and side walls. The side walls of the housing 14 are overlaped with and secured to the side walls of the housing 13 by means of screws 15. The cross-section of the cover 14 is larger than that of the housing 13 so that an air inlet 16 is formed around the housing 13. There is further provided a sponge material 17 around the housing 13 for filtering the air coming into the top container 11. The container 11 is watertight but does not prevent the admission of air.

The bottom container 12 is constituted of a housing 18 which has an open top and holds a filtering material 21, such as sand and gravel, and a hopper-like cover 19. There are further provided water inlet openings 22 on the cover 19. The top container 11 and the bottom container 12 are interconnected by a hollow elongated member 26. The top end of the hollow member 26 is fixedly connected to the lower housing 13 and communicated therewith. The bottom end thereof is inserted in the top end of the hopper-like cover 19 and is connected with the cover 19 by means of screws 27. The height of the top container 11 with respect to the bottom container 12 can be adjusted by lowering or raising the hollow member 26 with respect to the cover 19. Since the housing 18 of the container 12 is provided with sand and gravel, the container 12 can be immobilized in the water.

Inside the container 12 is further provided an air receiving hollow column 23 which has its lower portion embedded in the filtering material 21 and has its upper portion extended outward from the container 12. The lower portion of the column 23 is connected to an inverted funnel 24 which is provided with openings 25 for admission of the water that enters in the container 12 through the openings 22 and then passes through the filtering material 21. At the top of the top container 11 is secured, such as by adhesive bonding, a watertight casing 28 which has a transparent glass cover 29 provided at its top side. Light reflecting elements 30 are provided at the inner side of the wall and on the inner bottom side of the casing 28. The light reflecting elements 30 may be mirrors or electroplated plastic articles. At the central portion of the bottom side of the casing 28 is a silicon photo cell 31.

There is further provided a motor 32 which is mounted in the housing 13 and is electrically connected to the silicon photo cell 31 through a conductor 37. An air pump 33 is connected to the motor 32 so that it can be operated by the motor 32 for pumping fresh air into the water. The air pump 33 is a reciprocating pump having a diaphragm or a rubber cup which is connected to the motor, for example, by being connected to an eccentric rotor mounted on an output shaft of the motor. Since such a pump construction is known in the art, the details thereof are not herein described. However, the pump may also be another type of pump that can accomplish the same effect as that achieved by the pump 33. The pump 33 is provided with an air conduit 34 which is extended along the hollow member 26 and into the hollow column 23. A weight 35 is attached to the bottom end of the conduit 34 for preventing the conduit 34 from floating.

There is further provided a sponge body 36 inserted in the hollow member 26 for preventing the water vapor from entering into the top container 11.

When the casing 28 receives the sunlight, the reflecting elements 30 reflect the light to the photo cell 31 and the cell 31, in turn, converts the solar energy into an electric power to actuates the motor 32 through the conductor 37. Since the casing 28 is provided with light reflecting elements 30, the required magnitude of the silicon photo cell 31 may be reduced.

Preferably, the conductor is directed into the the container 11 in such a manner that it is, firstly, extended downward along the outerside of the wall of the housing 14 to some extent and then bent upward to extend into the inner side of the housing 13, thereby preventing the water or rain water from entering into the container 11.

When the motor is actuated, the eccentric rotor causes the diaphragm or the rubber cup to reciprocate, thereby pumping the air present in the container 11 into the hollow column 23. While pumping the air, the air outside the container 11 will enter into the container 11 through the inlet 16 and the filtering sponge 17. When the air is discharged in the hollow column 23, the air rises from the column 23 in the form of air bubbles, drawing out some amount of water from the column 23. The reduced water pressure in the column 23 causes the outside water to enter into the column 23 through the openings 22 of the cover 19, the filtering medium and the openings 25 of the funnel 24. While the water is passing through the filtering medium, some water polluting material is removed from the water which enters in the column 23. In this way, the present apparatus not only pumps the air into the water to replenish the amount of dissolved oxygen but also effects some degree of filtration.

With the invention thus explained, it is apparent that various variations and modifications can be made without departing from the scope of the invention. It is therefore intended that the invention be limited as indicated in the appended claims.

What I claim is:

1. A solar water conditioning apparatus for a fishpond comprising:

a top container having an air inlet for exposure to the atmosphere;

a bottom container for being immersed in water which has a water inlet and contains a filtering material which fills a part of said lower container;

an elongated member for supporting said top container which interconnects said top and bottom containers;

means for converting solar energy into electric power provided at the top of said top container;

a motor actuated by said converting means mounted in said top container and connected to said converting means;

an air receiving hollow column provided in said lower container, said column having its lower portion embedded in said filtering material and its upper portion opened and extended outward from said lower container, said lower portion being provided with an opening for the admission of water; and an air pump mounted in said top container and connected to said motor, said air pump having an air conduit extended into said air receiving column.

2. A solar water conditioning apparatus as claimed in claim 1, wherein said energy converting means includes a watertight casing having a top cover made of a transparent material, a photo cell disposed in said casing, and means for reflecting sunlight on said photo cell.

3. A solar water conditioning apparatus as claimed in claim 1, wherein said air pump is a reciprocating pump which has a diaphram to be reciprocated by said motor for discharging and suctioning air.

4. A solar water conditioning apparatus as claimed in claim 1, wherein said filtering material includes sand and gravel.

5. A solar water conditioning apparatus as claimed in claim 1, wherein said elongated member is a hollow member which has its top end fixedly connected to said top container and its bottom end connected to said bottom container in an upwardly or downwardly movable position.

6. A solar water conditioning apparatus as claimed in claim 1, said top container is further provided with an air filtering material at said air inlet.

* * * * *